US010754652B2

(12) United States Patent
Yamamura et al.

(10) Patent No.: US 10,754,652 B2
(45) Date of Patent: Aug. 25, 2020

(54) PROCESSOR AND CONTROL METHOD OF PROCESSOR FOR ADDRESS GENERATING AND ADDRESS DISPLACEMENT

(71) Applicant: FUJITSU LIMITED, Kawasaki-shi, Kanagawa (JP)

(72) Inventors: Shuji Yamamura, Yokohama (JP); Takumi Maruyama, Yokohama (JP); Masato Nakagawa, Yokohama (JP); Masahiro Kuramoto, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 15/606,050

(22) Filed: May 26, 2017

(65) Prior Publication Data
US 2018/0004515 A1    Jan. 4, 2018

(30) Foreign Application Priority Data

Jun. 29, 2016   (JP) .................................. 2016-128447

(51) Int. Cl.
*G06F 9/302*     (2018.01)
*G06F 9/32*      (2018.01)
(Continued)

(52) U.S. Cl.
CPC .......... *G06F 9/3016* (2013.01); *G06F 9/3001* (2013.01); *G06F 9/30036* (2013.01);
(Continued)

(58) Field of Classification Search
CPC ...... G06F 9/325; G06F 9/3016; G06F 9/3001; G06F 9/3867; G06F 9/3005;
(Continued)

(56) References Cited

U.S. PATENT DOCUMENTS 5,535,410 A  *  7/1996  Watanabe ........... G06F 9/30189
                                                      712/20
6,085,302 A  *  7/2000  Mahalingaiah ....... G06F 9/3885
                                                      711/117

(Continued)

FOREIGN PATENT DOCUMENTS

| JP | 2008-003708 | 1/2008 |
| JP | 2015-055971 | 3/2015 |
| WO | 02/37264 A2 | 5/2002 |

OTHER PUBLICATIONS

The Shift Register, pp. 1-12, Electronics Tutorials (www.electronics-tutorials.ws/sequential/seq_5.html) (Year: 2020).*

(Continued)

*Primary Examiner* — Daniel H Pan
(74) *Attorney, Agent, or Firm* — Fujitsu Patent Center

(57) ABSTRACT

A processor includes: an address generating unit that, when an instruction decoded by a decoding unit is an instruction to execute arithmetic processing on a plurality of operand sets each including a plurality of operands that are objects of the arithmetic processing, in parallel a plurality of times, generates an address set corresponding to each of the operand sets of the arithmetic processing for each time, based on a certain address displacement with respect to the plurality of operands included in each of the operand sets; a plurality of instruction queues that hold the generated address sets corresponding to the respective operand sets, in correspondence to respective processing units; and a plurality of processing units that perform the arithmetic processing in parallel on the operand sets obtained based on the respective address sets outputted by the plurality of instruction queues.

8 Claims, 12 Drawing Sheets

(51) Int. Cl.
*G06F 15/80* (2006.01)
*G06F 9/30* (2018.01)
*G06F 9/345* (2018.01)
*G06F 9/38* (2018.01)

(52) U.S. Cl.
CPC .......... *G06F 9/30065* (2013.01); *G06F 9/345* (2013.01); *G06F 9/3455* (2013.01); *G06F 9/3887* (2013.01); *G06F 15/80* (2013.01)

(58) Field of Classification Search
CPC ............... G06F 9/3802; G06F 15/8007; G06F 9/30065; G06F 9/345; G06F 9/3455; G06F 9/30101; G06F 9/3013; G06F 9/35; G06F 9/4881; G06F 9/3887; G06F 9/342; G06F 13/37; G06F 15/80; G11C 8/00
USPC .................................... 711/211; 712/213, 22
See application file for complete search history.

(56) References Cited

U.S. PATENT DOCUMENTS

| | | | |
|---|---|---|---|
| 6,505,288 B1* | 1/2003 | Jang ........................ | G06F 9/345 711/220 |
| 6,915,411 B2* | 7/2005 | Moreno .............. | G06F 15/8092 712/22 |
| 7,366,885 B1* | 4/2008 | Radhakrishnan ... | G06F 9/30018 711/125 |
| 8,161,437 B2* | 4/2012 | Oktem .................. | G06F 30/327 716/104 |
| 2007/0113058 A1* | 5/2007 | Tran ..................... | G06F 9/30036 712/241 |
| 2007/0294514 A1 | 12/2007 | Hosogi et al. | |
| 2008/0301354 A1* | 12/2008 | Bekooij .............. | G06F 12/0284 711/100 |
| 2009/0150137 A1* | 6/2009 | Kumazaki ........... | G06F 11/3419 703/14 |
| 2009/0204754 A1* | 8/2009 | Raubuch ............. | G06F 9/30181 711/109 |
| 2011/0153707 A1 | 6/2011 | Ginzburg et al. | |
| 2013/0311686 A1* | 11/2013 | Fetterman ............. | H04L 49/254 710/54 |
| 2014/0189287 A1* | 7/2014 | Plotnikov ........... | G06F 9/30145 712/3 |
| 2015/0074163 A1 | 3/2015 | Horio | |

OTHER PUBLICATIONS

EPOA—Office Action of European Patent Application No. 17172714.2 dated May 15, 2019. **US2011/0153707A1 cited in the EPOA was previously submitted in the IDS filed on May 2, 2018.
Extended European Search dated Apr. 20, 2018 for corresponding European Patent Application No. 17172714.2, 10 pages. Please note US-2007/0294514-A1 cited herewith, was previously cited in an IDS filed on May 26, 2017.*.

* cited by examiner

F I G. 5
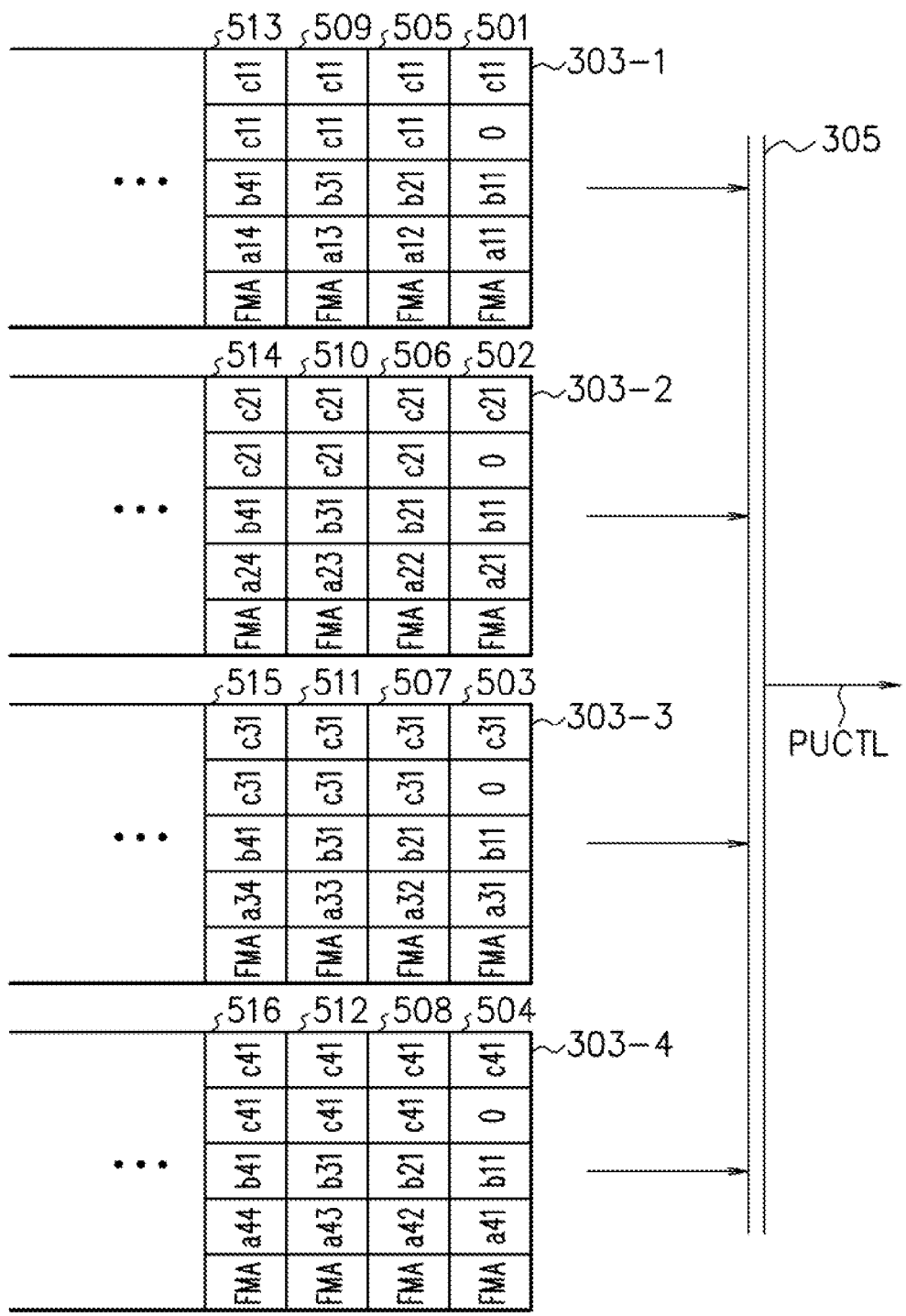

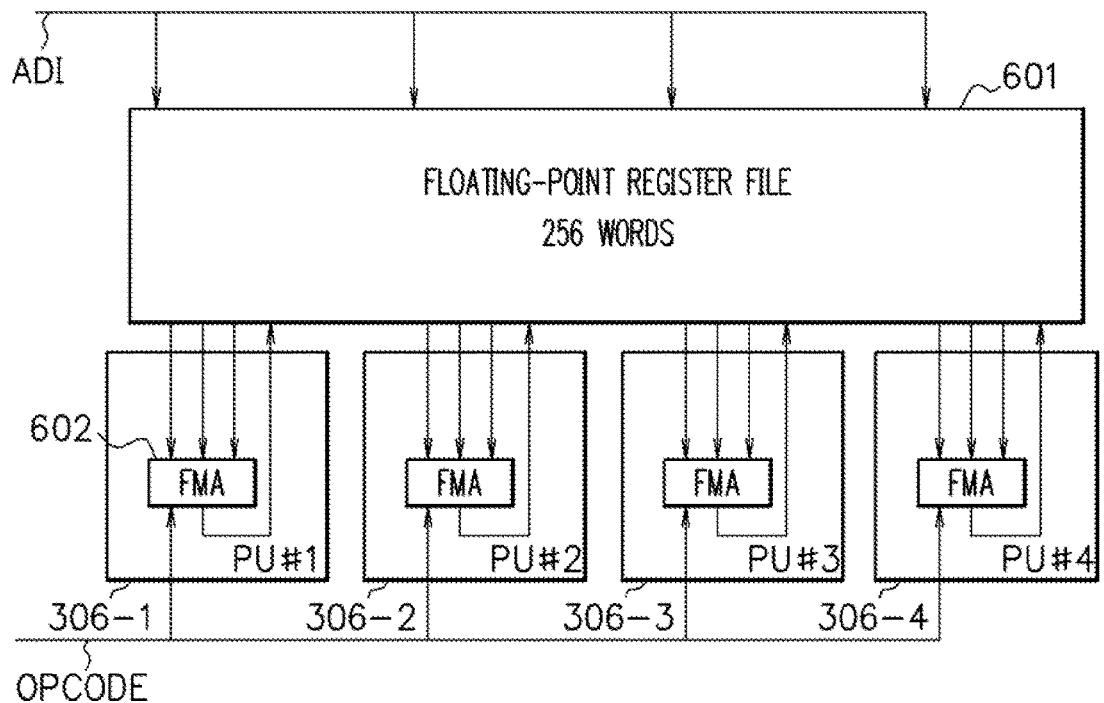

FIG. 12
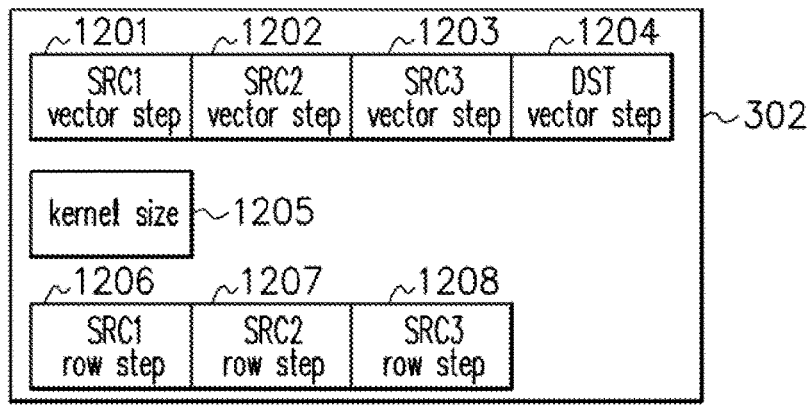
FIG. 13
```
for (v = 0; v < 4 ;v++) {
  for (f = 0; f < 4 ;f++) {
    dst_reg = fdst + v * dst_vector_step + f;
    %fr [dst_reg] = 0
    for (a = 0; a < kernel_size ; a++) {
      for (b = 0; b < kernel_size ; b++) {
        src1_reg = fsrc1 + v * src1_vector_step + f + a * src1_row_step + b;
        src2_reg = fsrc2 + v * src2_vector_step + f + a * src2_row_step + b;
        src3_reg = fsrc3 + v * src3_vector_step + f + a * src3_row_step + b;
        // %fr[dst_reg] = %fr[src1_reg] * %fr[src2_reg] + %fr[src3_reg];
      }
    }
  }
}
```
FIG. 14A
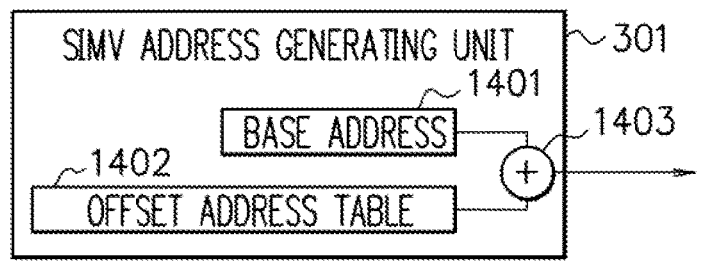
FIG. 14B
| 0  | 1  | 2  |
|----|----|----|
| 6  | 7  | 8  |
| 12 | 13 | 14 |

| | | CYCLE |
|---|---|---|
| SIMD FMA a11, b11, 0, c11 | a11×b11+0→c11 FIRST STAGE | 1 |
| | SECOND STAGE | 2 |
| | THIRD STAGE | 3 |
| | FOURTH STAGE | 4 |
| SIMD FMA a12, b21, c11, c11 | a12×b21+c11→c11 FIRST STAGE | 5 |
| | SECOND STAGE | 6 |
| | THIRD STAGE | 7 |
| | FOURTH STAGE | 8 |

FIG. 21

| CYCLE | SIMD FMA a11,b11,0,c11 | SIMD FMA a21,b11,0,c21 | SIMD FMA a31,b11,0,c31 | SIMD FMA a41,b11,0,c41 |
|---|---|---|---|---|
| 1 | a11×b11+0→c11 FIRST STAGE | | | |
| 2 | SECOND STAGE | a21×b11+0→c21 FIRST STAGE | | |
| 3 | THIRD STAGE | SECOND STAGE | a31×b11+0→c31 FIRST STAGE | |
| 4 | FOURTH STAGE | THIRD STAGE | SECOND STAGE | a41×b11+0→c41 FIRST STAGE |
| 5 | a12×b21+c11→c11 FIRST STAGE | FOURTH STAGE | THIRD STAGE | SECOND STAGE |
| 6 | SECOND STAGE | a22×b21+c21→c21 FIRST STAGE | FOURTH STAGE | THIRD STAGE |
| 7 | THIRD STAGE | SECOND STAGE | a32×b21+c31→c31 FIRST STAGE | FOURTH STAGE |
| 8 | FOURTH STAGE | THIRD STAGE | SECOND STAGE | a42×b21+c41→c41 FIRST STAGE |
| 9 | a13×b31+c11→c11 FIRST STAGE | FOURTH STAGE | THIRD STAGE | SECOND STAGE |
| 10 | SECOND STAGE | a23×b31+c21→c21 FIRST STAGE | FOURTH STAGE | THIRD STAGE |
| t11 | THIRD STAGE | SECOND STAGE | a33×b31+c31→c31 FIRST STAGE | FOURTH STAGE |

FIG. 22

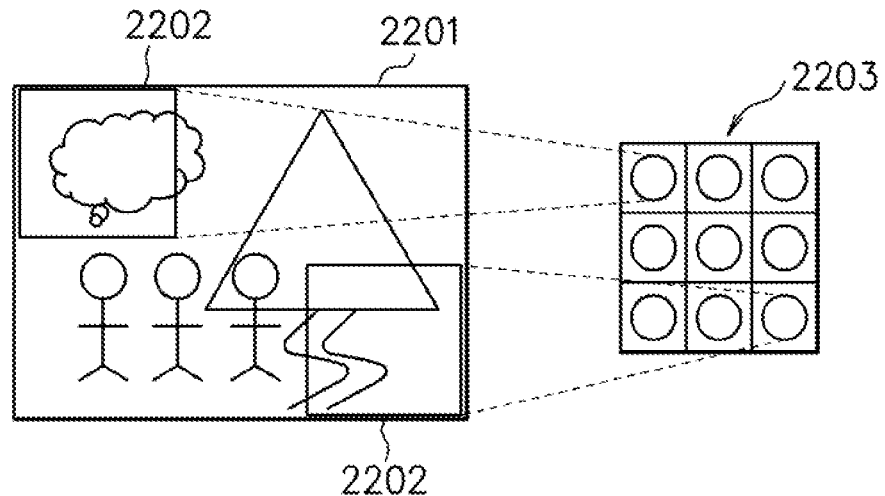

FIG. 23

| CYCLE | | | |
|---|---|---|---|
| 1 | a11×b11+0→c11 FIRST STAGE | | SIMD FMA a11, b11, 0, c11 |
| 2 | SECOND STAGE | a21×b11+0→c21 FIRST STAGE | SIMD FMA a21, b11, 0, c21 |
| 3 | a12×b21+c11→c11 FIRST STAGE | SECOND STAGE | SIMD FMA a12, b21, c11, c11 |
| 4 | SECOND STAGE | a22×b21+c21→c21 FIRST STAGE | SIMD FMA a22, b21, c21, c21 |
| 5 | a31×b11+0→c31 FIRST STAGE | SECOND STAGE | SIMD FMA a31, b11, 0, c31 |
| 6 | SECOND STAGE | a41×b11+0→c41 FIRST STAGE | SIMD FMA a41, b11, 0, c41 |
| 7 | a32×b21+c31→c31 FIRST STAGE | SECOND STAGE | SIMD FMA a32, b21, c31, c31 |
| 8 | SECOND STAGE | a42×b21+c41→c41 FIRST STAGE | SIMD FMA a42, b21, c41, c41 |
| 9 | | SECOND STAGE | | t

PROCESSOR AND CONTROL METHOD OF PROCESSOR FOR ADDRESS GENERATING AND ADDRESS DISPLACEMENT

CROSS-REFERENCE TO RELATED APPLICATION

This application is based upon and claims the benefit of priority of the prior Japanese Patent Application No. 2016-128447, filed on Jun. 29, 2016, the entire contents of that are incorporated herein by reference.

FIELD

The embodiments discussed herein are directed to a processor and a control method of a processor.

BACKGROUND

A SIMD (Single Instruction Multiple Data) instruction is one of instructions for the execution of arithmetic processing on multiple data with a single instruction. The SIMD instruction will be described with reference to FIG. 16. A processor that executes the SIMD instruction includes an instruction buffer 1601 storing instructions, a plurality of processing units (PU) 1602-1 to 1602-4 which perform arithmetic processing, and a data buffer 1603 storing data. In the execution of one SIMD instruction fetched from the instruction buffer 1601, the processing units 1602-1 to 1602-4 concurrently apply arithmetic processing indicated by the instruction to a plurality of data D1 to D4 stored in the data buffer 1603. The SIMD instruction is used when the same arithmetic processing is executed on a plurality of data in parallel, as is done in matrix calculation.

Square matrix multiplication illustrated in FIG. 17 will be described as an example. In this square matrix multiplication, a 4-row×4-column matrix C is calculated by the multiplication of a 4-row×4-column matrix A and a 4-row×4-column matrix B. The numerical values of each element of the matrices represent "row number" and "column number". For example, "a12" represents a data element at the first row and second column of the matrix A. An element cij at the i-th row and j-th column of the 4-row×4-column matrix C is calculated by the following multiply-add operation.

$$cij = ai1 \times b1j + ai2 \times b2j + ai3 \times b3j + ai4 \times b4j$$

For example, an element c11 at the first row and first column of the matrix C is calculated by the following multiply-add operation.

$$c11 = a11 \times b11 + a12 \times b21 + a13 \times b31 + a14 \times b41 \quad (1)$$

It is assumed that the processing units of the processor are each capable of executing the multiply-add operation of "C=A×B+C". This arithmetic processing is generally called FMA (Floating point Multiply Add, Fused Multiply Add, etc.), and recent processors include FMA instructions implemented thereon. The FMA instruction is typically given totally four operands, namely, three operands A, B, C as source operands which are objects of the operation and one operand C as a destination operand which is the operation result.

The element c11 at the first row and first column of the matrix C, which is found by the aforesaid expression (1), can be calculated with the following four FMA instructions. Note that, in the description below, operands given to each of the FMA instructions are the source operand A, the source operand B, the source operand C, and the destination operand C in this order. In the first FMA instruction, 0 is given as an initial value of the result of the multiply-add operation.

FMA a11, b11, 0, c11
FMA a12, b21, c11, c11
FMA a13, b31, c11, c11
FMA a14, b41, c11, c11

The elements of the matrix C can be calculated in parallel because of no dependency among the arithmetic processing of the elements. Accordingly, if a processor which executes a SIMD instruction includes four processing units and performs FMA operations as the SIMD instruction, it is possible to concurrently calculate the four elements of the matrix C. For example, as illustrated in FIG. 18, by a processing unit (PU #1) 1801 executing the operation relevant to the element c11 of the matrix C, a processing unit (PU #2) 1802 executing the operation relevant to the element c12 of the matrix C, a processing unit (PU #3) 1803 executing the operation relevant to the element c13 of the matrix C, and a processing unit (PU #4) 1804 executing the operation relevant to the element c14 of the matrix C, it is possible to concurrently calculate the elements c11, c12, c13, c14 of the matrix C with the four processing units (PC). Accordingly, the calculation of the elements on one row of the matrix C is completed with the four SIMD instructions, and this is repeated four times, that is, the calculation of all the sixteen elements of the matrix C is completed with sixteen SIMD instructions.

If FMA instructions are executed using high-frequency design hardware, the cycle time which is a reciprocal of the frequency becomes further shorter, making it difficult to complete the execution of the FMA instruction in one cycle. For example, if the operation latency of the FMA instruction is four cycles, it is necessary to execute the instruction every four cycles, with a time lag corresponding to three cycles being provided in each interval between the SIMD FMA instructions as illustrated in FIG. 19A, resulting in pipeline bubbles during the three cycles. A method called a software pipeline is one method to avoid the pipeline bubbles. The software pipeline improves the operating rate of a processing unit by inserting other instructions having no data dependency into an empty cycle between instructions having data dependency. For example, as illustrated in FIG. 19B, in empty cycles of a processor calculating a certain element of a matrix, a sequence of instructions for calculating other elements of the matrix is inserted.

FIG. 20 and FIG. 21 illustrate timing charts when the instructions are executed as illustrated in FIG. 19A and FIG. 19B respectively. As illustrated in FIG. 20 where the software pipeline is not used, the FMA instructions are each executed in four cycles, namely, the first stage to the fourth stage. After the first instruction is supplied for the execution, there is a four-cycle latency time until the next instruction having data dependency is supplied, and accordingly the three stages other than the stage where the execution is progressing becomes idle. On the other hand, as illustrated in FIG. 21 where the software pipeline is used, cycles where instructions are supplied and executed are staggered by one cycle each time, which makes it possible to execute the instructions in different stages concurrently, enabling the highly efficient operation of the arithmetic units.

Patent Document 1: Japanese Laid-open Patent Publication No. 2015-55971
Patent Document 2: Japanese Laid-open Patent Publication No. 2008-3708

However, even if the SIMD instruction for the aforesaid parallel arithmetic processing is used, it requires many instructions to execute the same arithmetic processing on a plurality of data a plurality of times as in matrix calculation. For example, the above-described operation of the 4-row×4-column square matrix multiplication requires only sixteen instructions, but as the size N of the square matrix is larger, the number of instructions increases on an O ($N^2$) order. Further, in a convolution operation often used in deep learning, if an image size is N×N and a kernel size is M×M, the number of instructions increases on an O ($N^2M^2$) order.

The convolution operation is processing which uses a small rectangular filter to extract a characteristic structure that the filter has, from an original image. As illustrated in FIG. 22, features of small rectangular areas 2202 are extracted from a target image 2201, and then are used to create pixels of an image 2203 of the next layer. The rectangular area at this time is called a kernel and is an image data area used for calculating one element of the image of the next layer. By a multiply-add operation on this area using values defining feature quantities, a pixel value is generated. In the convolution operation, the number of instructions increases on an O ($N^2M^2$) order and accordingly, a size increase of the kernel results in an explosive increase of the number of instructions. This requires a large amount of resources such as buffers for storing the instructions and also necessitates decoding and issuing of the instructions in each cycle, leading to large power consumption.

Further, where the aforesaid software pipeline is employed, a decrease of the operation latency by the development of a successor model or the dynamic extension of the operation latency due to power saving control necessitates optimally arranging a sequence of instructions by recompiling. The recompiling is difficult in some case in a library or the like shared by many applications. FIG. 23 illustrates a timing chart when the operation latency becomes two cycles in the aforesaid example. By issuing a set of two instructions having no data dependency one after another so that two instructions are issued over two cycles as illustrated in FIG. 23, it is possible for all the stages (two stage) to efficiently work, but this requires the recompiling.

SUMMARY

A processor according to an embodiment includes: a decoding unit that decodes an instruction; an address generating unit that, when the instruction decoded by the decoding unit is an instruction to execute arithmetic processing on a plurality of operand sets each including a plurality of operands that are objects of the arithmetic processing, in parallel a plurality of times, generates an address set corresponding to each of the operand sets of the arithmetic processing for each time, based on a certain address displacement with respect to the plurality of operands included in each of the operand sets; a plurality of address holding units that hold the address sets corresponding to the respective operand sets, that are generated by the address generating unit, in correspondence to respective processing units; and a plurality of processing units that perform the arithmetic processing in parallel on the operand sets obtained based on the respective address sets outputted by the plurality of address holding units.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 5 is a chart illustrating an example of storage information in the vector instruction queues in this embodiment;

FIG. 6 is a diagram illustrating a configuration example of a processing unit in this embodiment;

FIG. 7 is a timing chart illustrating an example of how matrix multiplication is executed according to a SIMV instruction in this embodiment;

Figures 10A, 10B, 10C, 10D, 11:
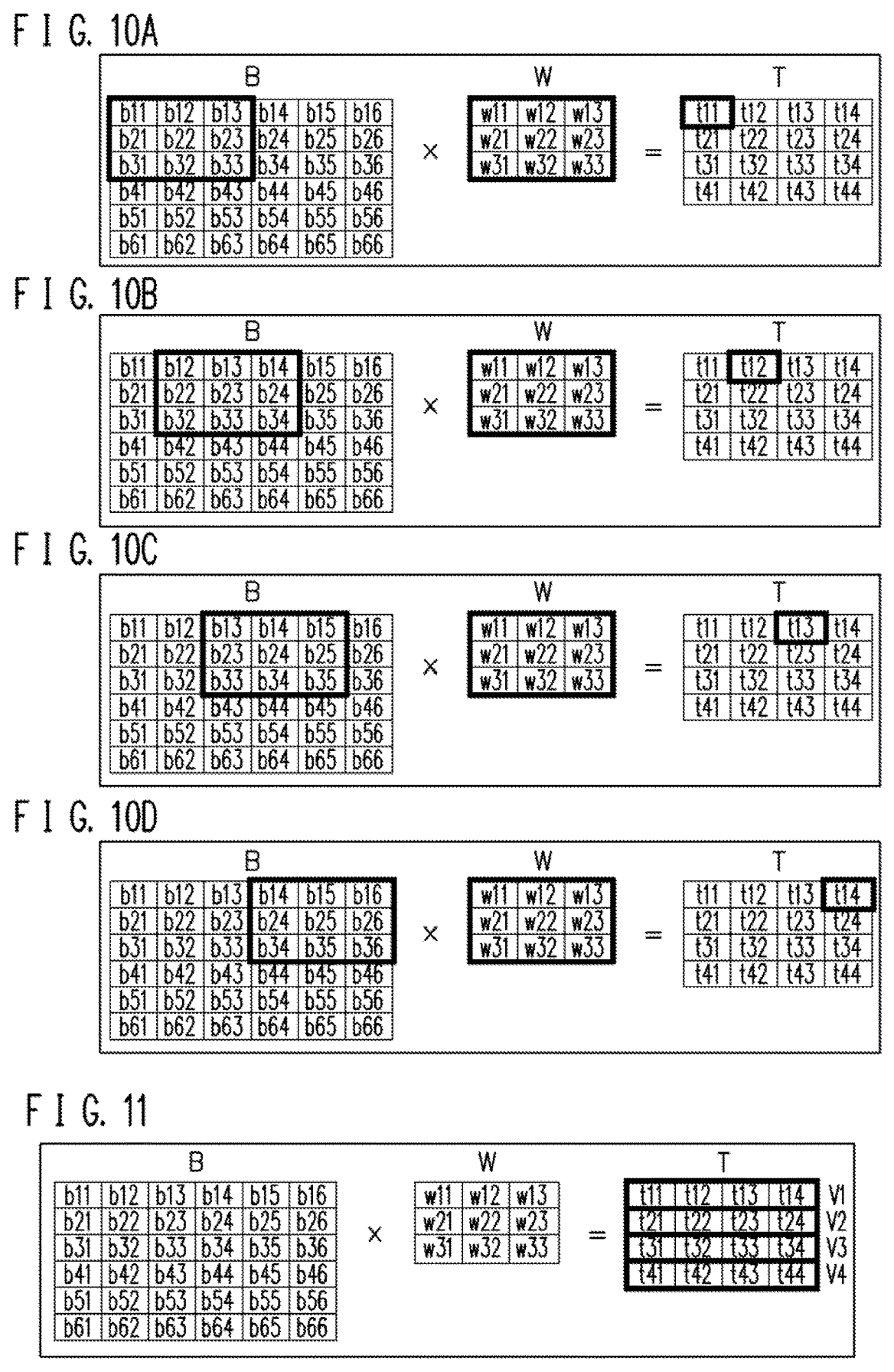

FIG. 10A to FIG. 10D are explanatory charts of a convolution operation;

FIG. 11 is an explanatory chart of how the convolution operation is executed according to the SIMV instruction in this embodiment;

FIG. 12 is a chart illustrating an example of SIMV control information involved in the convolution operation in this embodiment;

FIG. 13 is a chart illustrating an example of an address generation pseudo-code involved in the convolution operation in this embodiment;

FIG. 14A is a diagram illustrating another configuration example of the SIMV address generating unit in this embodiment;

FIG. 14B is a chart illustrating an example of an address pattern of operands involved in the convolution operation;

Figure 18:
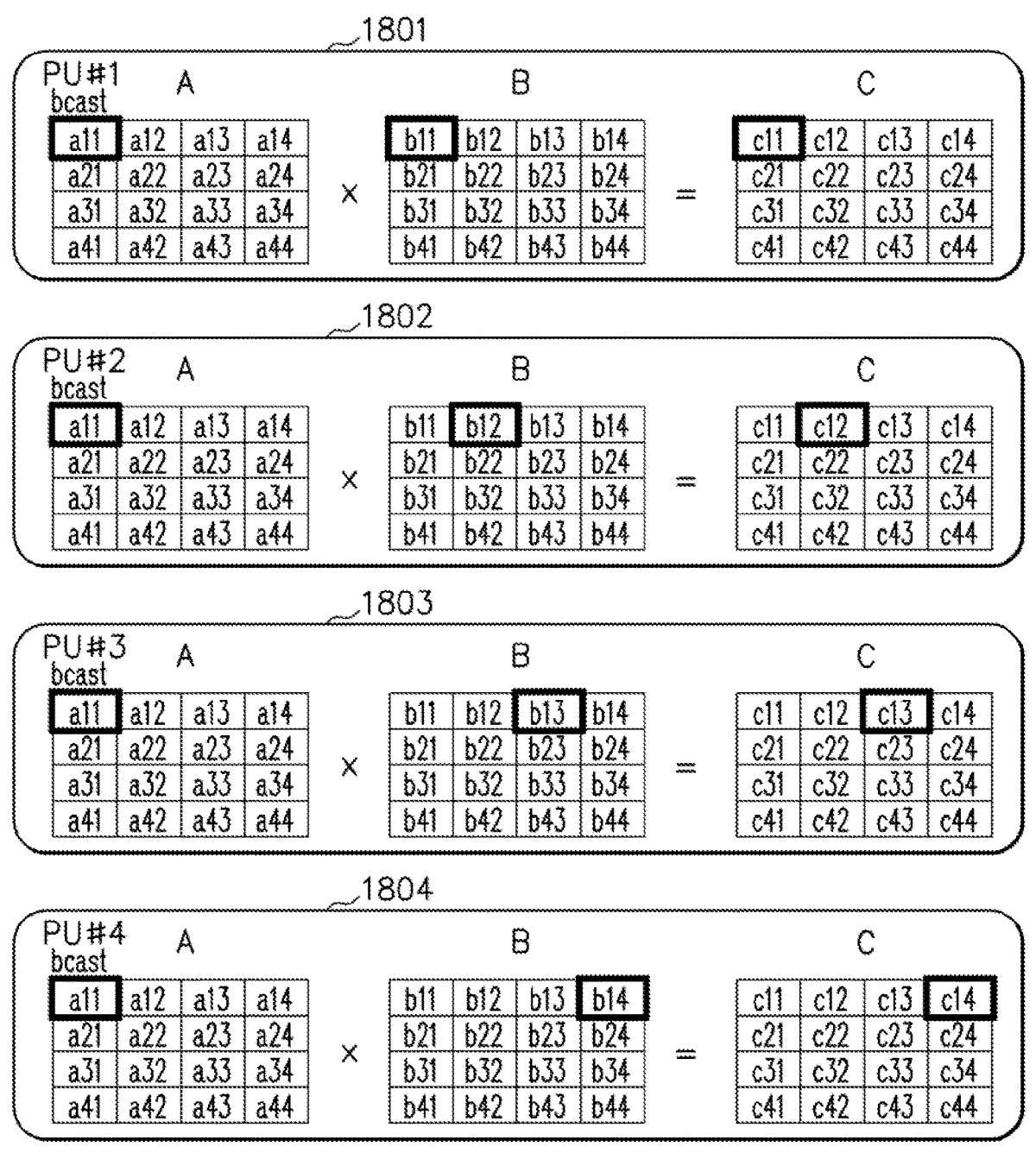

FIG. 18 is an explanatory chart of how operations regarding four elements of a matrix C are executed according to the SIMD instruction;

FIG. 20 is a timing chart illustrating an example of the execution of the instructions when a software pipeline is not employed;

FIG. 21 is a timing chart illustrating an example of the execution of the instructions when the software pipeline is employed;

FIG. 22 is an explanatory chart of a convolution operation; and

FIG. 23 is a timing chart illustrating an example of the execution of the instructions when the software pipeline is employed.

DESCRIPTION OF EMBODIMENTS

Hereinafter embodiments will be described with reference to the drawings.

A processor in this embodiment described below is capable of executing a SIMV (Single Instruction Multiple Vector) instruction for executing arithmetic processing on a plurality of operand sets in parallel a plurality of times with a single instruction, the operand sets each including a plurality of operands which are objects of the arithmetic processing. With a focus on the fact that addresses of operands involved in arithmetic processing according to a SIMD instruction have regularity, the SIMV instruction gives the addresses of the operands as control information, whereby the same arithmetic processing on a plurality of data in, for example, a matrix multiplication operation is executed in parallel a plurality of times and completed with one instruction.

Figure 1:
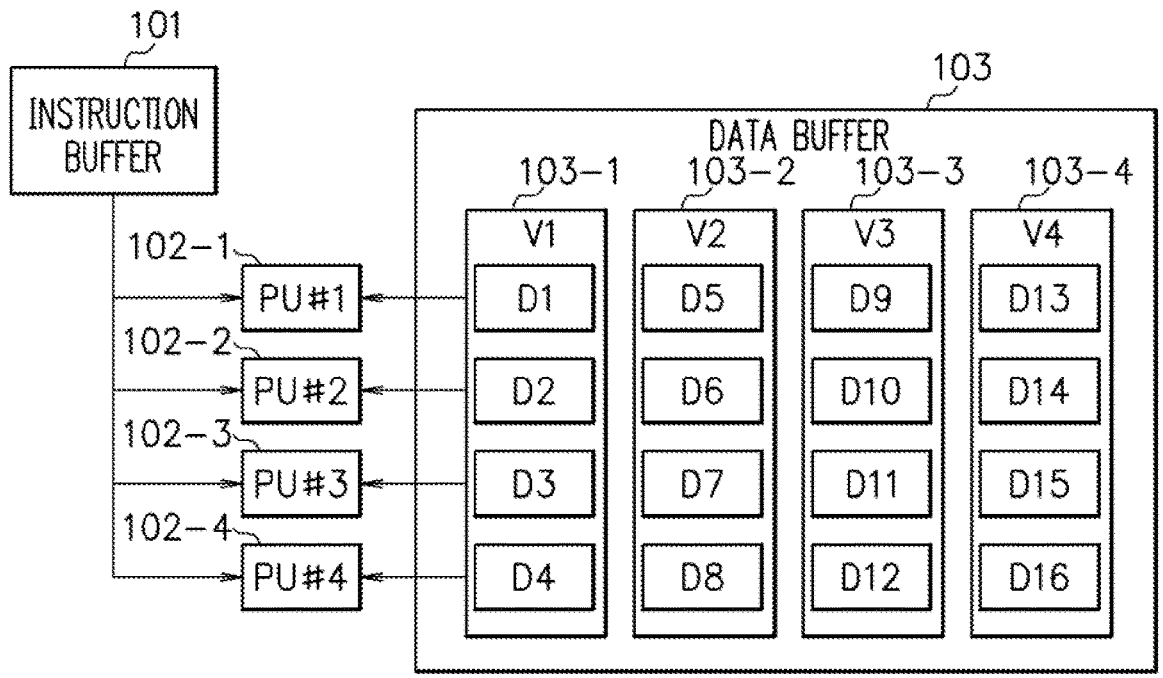
FIG. 1 is a diagram illustrating a configuration example of a processor in an embodiment.

FIG. 1 is a diagram illustrating a configuration example of the processor in this embodiment capable of executing the SIMV instruction. The processor capable of executing the SIMV instruction in this embodiment includes an instruction buffer 101 storing instructions, a plurality of processing units (PU) 102-1 to 102-4 which perform arithmetic processing, and a data buffer 103 storing data.

In the execution of one SIMV instruction fetched from the instruction buffer 101, the processing units 102-1 to 102-4 apply the same arithmetic processing indicated by the instruction concurrently to a plurality of data stored in the data buffer 103. The operation target data to which the same processing is applied are called "vectors", and the same arithmetic processing is applied to continuous vectors 103-1 to 103-4 in continuous cycles. Though FIG. 1 illustrates an example where the processor includes the four processing units 102-1 to 102-4, the number of the processing units that the processor includes may be any plural number.

Figure 2:
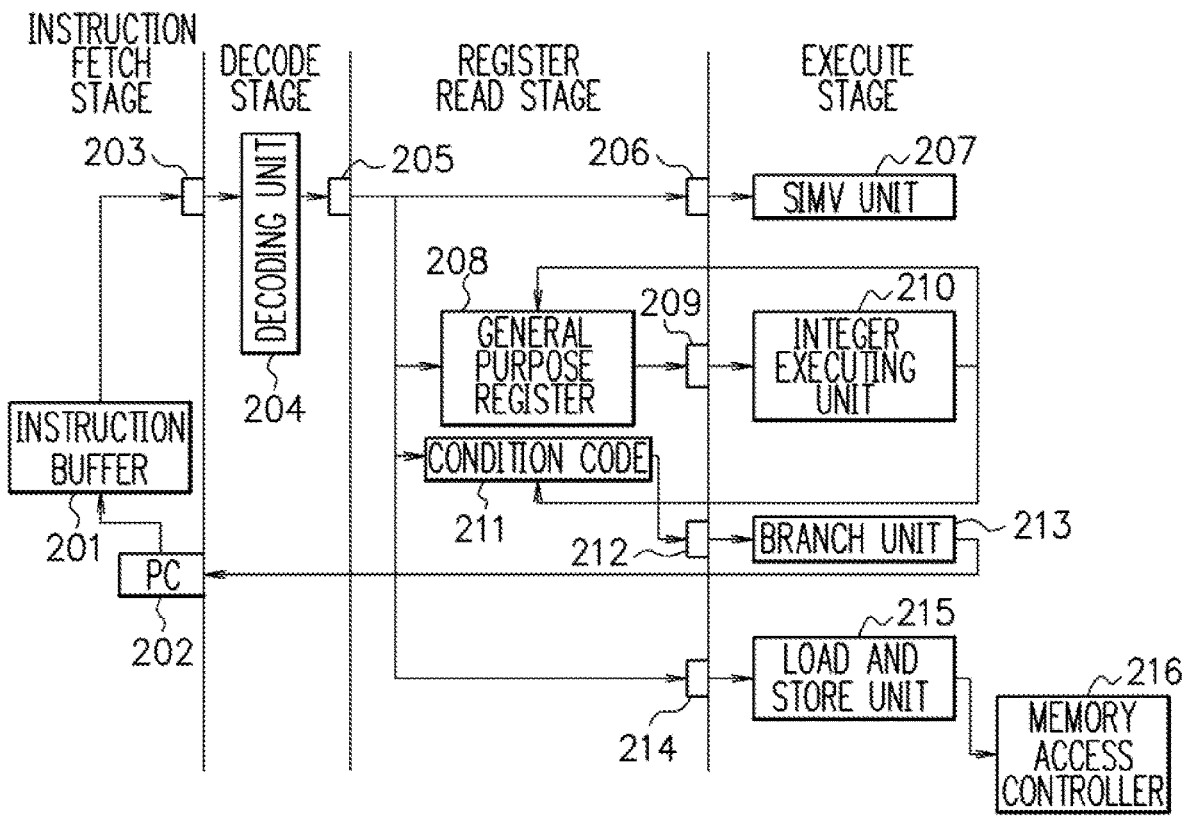
FIG. 2 is a diagram illustrating an instruction control pipeline of the processor in this embodiment.

FIG. 2 is a diagram illustrating an instruction control pipeline of the processor in this embodiment. The instruction control pipeline includes four stages, an instruction fetch stage, a decode stage, a register read stage, and an execute stage. In the instruction fetch stage, an instruction is fetched from an instruction buffer 201 based on a value of a program counter 202. In the decode stage, a decoding unit 204 decodes the instruction fetched from the instruction buffer 201.

In the register read stage, a register value is read from a general purpose register 208 or a condition code register 211. In the execute stage, each processing unit executes processing such as an operation according to the instruction. The processing units include, for example, a SIMV unit 207 which performs processing relevant to the SIMV instruction, an integer executing unit 210, a branch unit 213, and a load and store unit 215. Further, staging latches 203, 205, 206, 209, 212, 214 are disposed between the stages.

Figure 3:
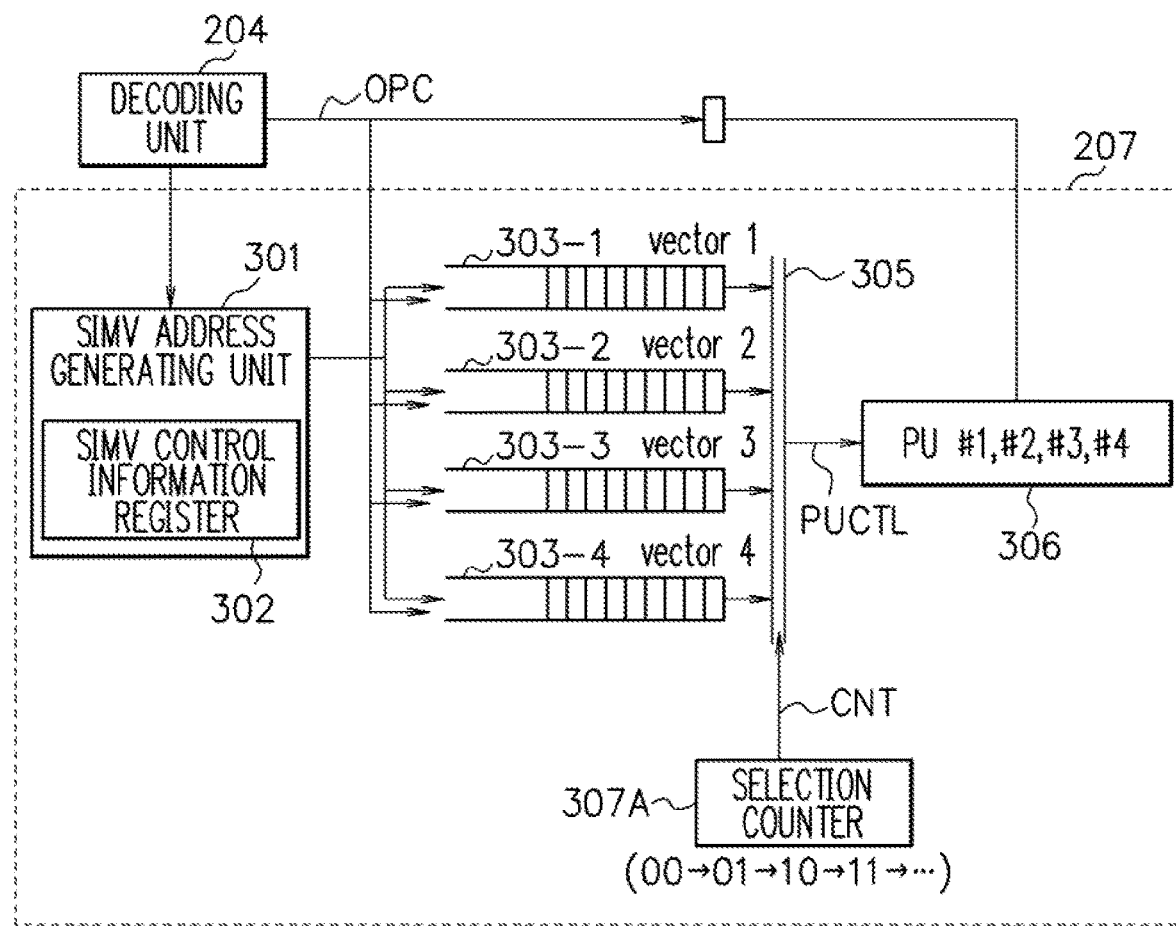
FIG. 3 is a diagram illustrating a configuration example of a SIMV unit in this embodiment.

FIG. 3 is a diagram illustrating a configuration example of the SIMV unit 207 which performs the processing relevant to the SIMV instruction. The SIMV unit 207 includes a SIMV address generating unit 301, vector instruction queues 303-1 to 303-4, a selector 305, a plurality of processing units 306, and a selection counter 307A.

In SIMV unit 207, the SIMV address generating unit 301 receives information regarding the SIMV instruction from the decoding unit 204. The SIMV address generating unit 301 includes a SIMV control information register 302 and generates addresses of operands for use in the execution of the arithmetic processing relevant to the SIMV instruction, based on the received information. SIMV control information constructed in advance on a memory is loaded to the SIMV control information register 302 according to a load instruction, so that values are set in the SIMV control information register 302.

Figure 4:
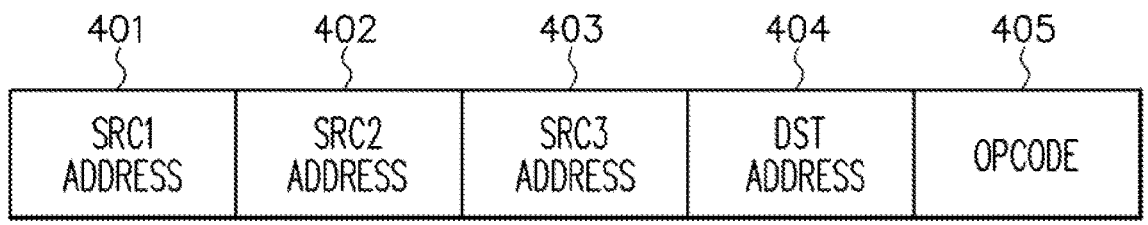
FIG. 4 is a chart illustrating an example of a set of an operation code and operand addresses which is stored in a vector instruction queue in this embodiment.

The SIMV address generating unit 301 generates addresses indicating data positions of vectors in a register file, based on the SIMV control information stored in the SIMV control information register 302 and supplies the generated addresses to the vector instruction queues 303-1 to 303-4. FIG. 4 illustrates an example of information stored in entries of the vector instruction queues 303-1 to 303-4. In a case of a FMA operation, for instance, the information stored in the vector instruction queues 303-1 to 303-4 includes addresses 401 to 404, which are addresses at which source operands 1, 2, 3 and a destination operand used for executing the FMA operation are stored in the register file, and an operation code 405 identifying an instruction instructing the type of the operation (FMA operation).

The SIMV unit 207 includes the same number of the vector instruction queues as the operation latency of the processing unit 306. In the example illustrated in FIG. 3, assuming that the FMA operation can be executed in four cycles, the SIMV unit 207 includes the four vector instruction queues 303-1 to 303-4. The selector 305 selects, by round-robin, a set of an operation code and operand addresses from the sets of the operation code and the operand addresses held in the four vector instruction queues 303-1 to 303-4 respectively, and transmits the selected set as PU control information PUCTL to the processing unit 306.

Out of the vector instruction queues 303-1 to 303-4, the vector instruction queue from which the selector 305 selects the set of the operation code and the operand addresses is decided based on a count value CNT of the selection counter 307A. The selection counter 307A counts the count value CNT in order of 00→01→10→11→00→ . . . . For example, when the count value CNT is 00, the selector 305 outputs the set of the operation code and the operand addresses selected from the vector instruction queue 303-1. When the count value CNT is 01, the selector 305 outputs the set of the operation code and the operand addresses selected from the vector instruction queue 303-2. When the count value CNT is 10, the selector 305 outputs the set of the operation code and the operand addresses selected from the vector instruction queue 303-3. When the count value CNT is 11, the selector 305 outputs the set of the operation code and the operand addresses selected from the vector instruction queue 303-4.

Figure 17:
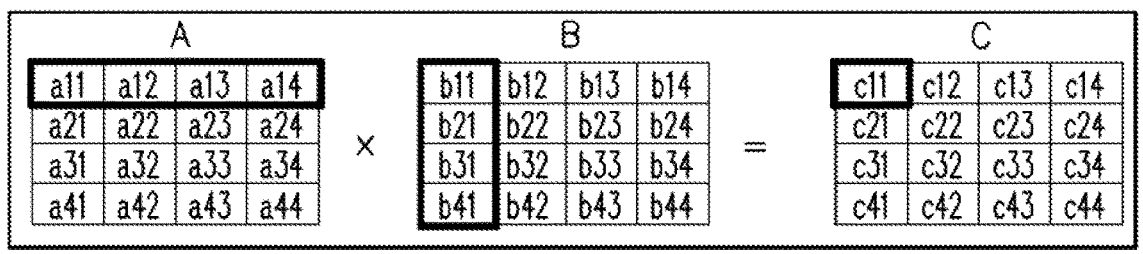
FIG. 17 is a chart illustrating an example of 4-row×4-column square matrix multiplication.
Figure 19B:
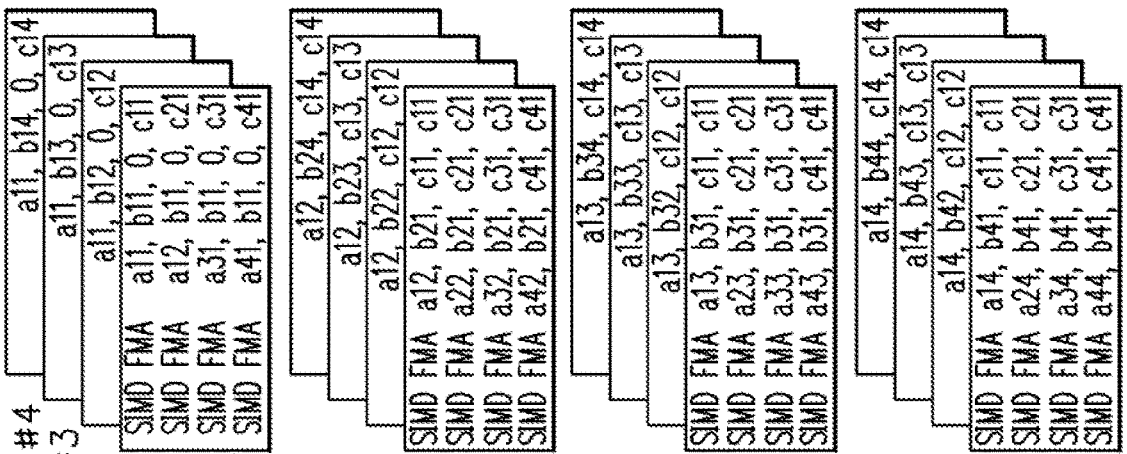
FIG. 19A and FIG. 19B are charts illustrating images of execution of the SIMD instruction.
Figure 19A:
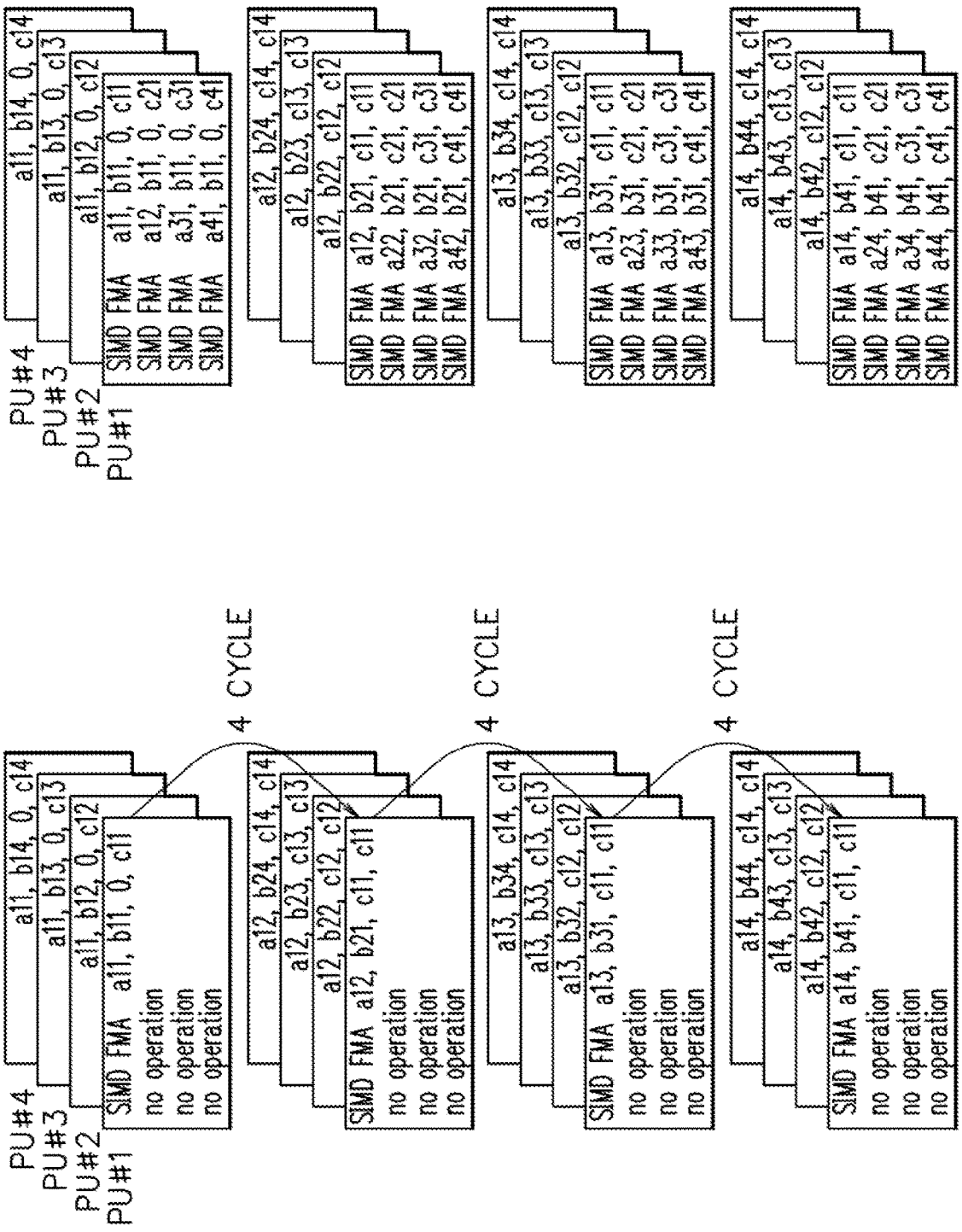

FIG. 5 illustrates a state where a plurality of sets each including an operation code of a FMA operation and a plurality of operands which are objects of the FMA operation are stored in parallel in each of the vector instruction queues 303-1 to 303-4 when 4-row×4-column square matrix multiplication illustrated in FIG. 17 is executed according to a SIMV instruction. In FIG. 5, the operands are denoted by the same symbols as in the aforesaid drawing for easier understanding, but actually, sets of an operation code and addresses in the register file, of operands corresponding to the operation code are stored. That is, as the whole vector instruction queues 303-1 to 303-4, the plural sets of the operation code and the addresses of the operands corresponding to the operation code are stored in parallel. They are queued in the vector instruction queues 303-1 to 303-4 in order in which the vectors are operated (in order of dependency). For example, in the example illustrated in FIG. 5, pieces of information 501, 502, 503, 504, 505, 506, 507, 508, 509, 510, 511, 512, 513, 514, 515, and 516 are transmitted in this order as the PU control information PUCTL to the processing unit 306.

FIG. 6 is a diagram illustrating a configuration example of the processing unit 306. In the example illustrated in FIG. 6, the processor, which includes four processing units 306-1 to 306-4 each including a FMA arithmetic unit 602, is capable of executing four multiply-add operations concurrently. A register file 601 capable of storing 64 floating-point values is provided so as to correspond to the FMA arithmetic units 602. According to received address information ADI, the register file 601 outputs four source operand sets each including three source operands to the FMA arithmetic units 602 of the processing units 306-1 to 306-4 respectively, and the operation results in the FMA arithmetic units 602 of the processing units 306-1 to 306-4 are written to the register file 601. Further, an operation code OPCODE instructing the multiply-add operation is inputted to the processing units 306-1 to 306-4.

FIG. 7 is a timing chart illustrating an example of how the square matrix multiplication which calculates the 4-row×4-column matrix C by multiplying the 4-row×4-column matrix A and the 4-row×4-column matrix B is executed according to the SIMV instruction. With the single SIMV instruction, the multiply-add operations are executed in parallel on the plural sets of the operands in the matrix multiplication operation a plurality of times, whereby the behavior similar to the execution by a software pipeline is achieved by hardware.

Figure 8:
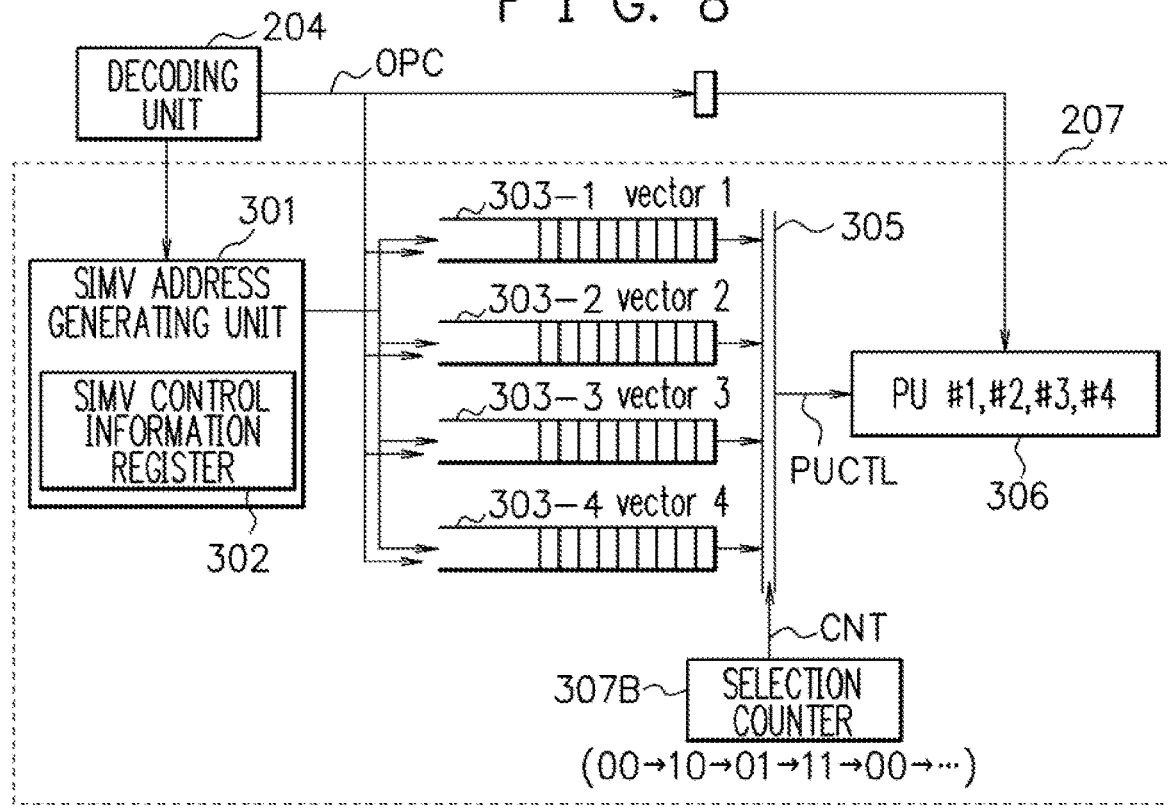
FIG. 8 is an explanatory diagram of control when operation latency is shortened to two cycles.

Further, the control when the operation latency is shortened to two cycles in a successor model will be described with reference to FIG. 8. A hardware configuration is the same, and there is no change in the SIMV instruction either. It is also the same that addresses are queued in the vector instruction queues from the SIMV address generating unit 301. When the operation latency is shortened to two cycles, a selection counter 307B counts a count value CNT in order of 00→10→01→11→00→ . . . . In accordance with thus updating the value of the selection counter in different order from that when the operation latency is four cycles, the PU control information PUCTL is fetched from the vector instruction queues in order of 303-1→303-3→303-2→303-4→303-1→ . . . . This makes it possible to efficiently operate the arithmetic units as in the case where the software pipeline is used, even if the operation latency changes to two cycles.

Figure 9:
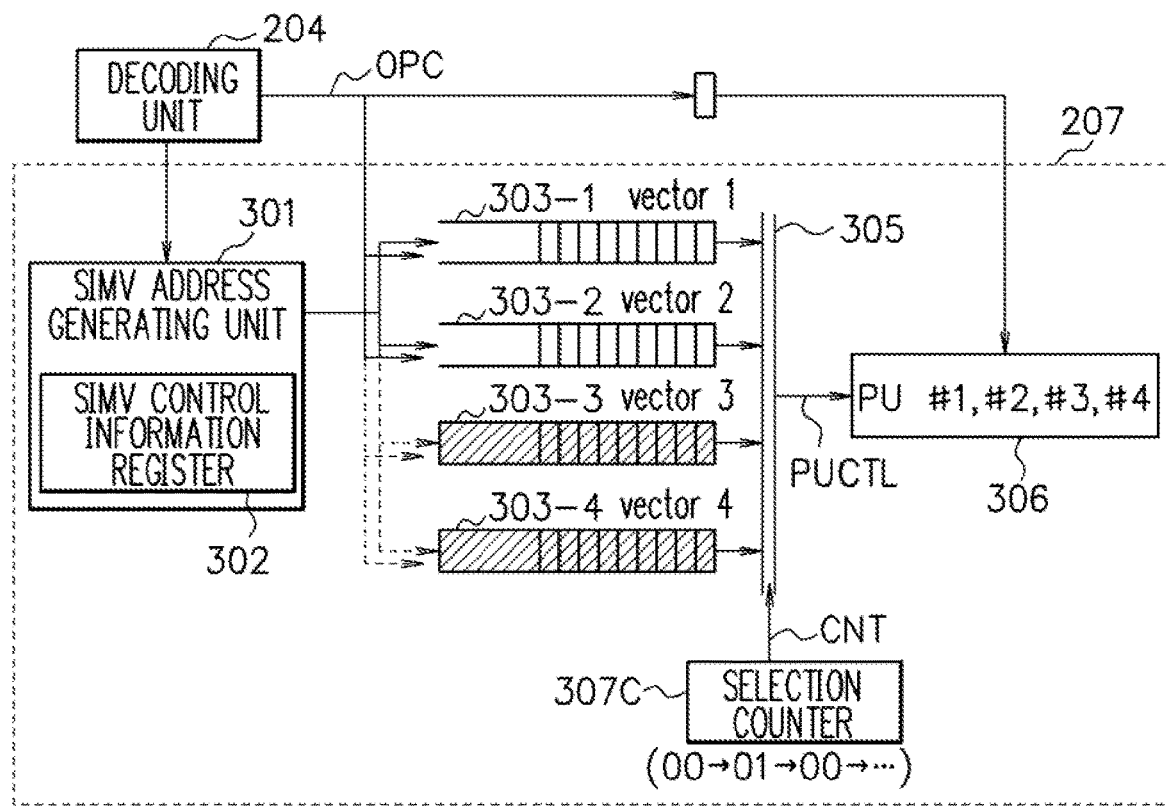
FIG. 9 is an explanatory diagram of control when the operation latency dynamically changes.

In a processor having a power saving function, its operating frequency is sometimes lowered with the intention to reduce power consumption, and as the operating frequency becomes lower, the number of cycles of the operation latency reduces. A SIMV unit adapted to such a power saving function will be described with reference to FIG. 9. In this example, it is assumed that the operating frequency can be reduced to half to reduce power consumption. In this case, the operation latency of the arithmetic processing is shortened from four cycles to two cycles.

The processor normally operates with the four-cycle operation latency similarly to the above-described example, and accordingly the four vector instruction queues 303-1 to 303-4 are operated. Further, a selection counter 307C counts a count value CNT in order of 00→01→10→11→00→ . . . . On the other hand, if the operating frequency is lowered with the intention to reduce the power consumption and accordingly the operation latency becomes two cycles, only the two vector instruction queues 303-1, 303-2 are used, and the control is changed so that the selection counter 307C counts in order of 00→01→00→01→00→ . . . . This control makes it possible to efficiently operate the arithmetic units without any change of a sequence of instructions using the SIMV instruction, even if the operation latency dynamically changes due to the lowering of the operating frequency for reducing the power consumption.

Next, an example where a convolution operation in deep learning is executed using the SIMV instruction in this embodiment will be described. FIG. 10A to FIG. 10D are explanatory charts of the convolution operation. The convolution operation is processing to generate top data (matrix T in FIG. 10A to FIG. 10D) by multiply-add operations on bottom data (matrix B in FIG. 10A to FIG. 10D) and weight data (matrix W in FIG. 10A to FIG. 10D). 3×3 frames illustrated by thick frames in FIG. 10A to FIG. 10D are kernels. One element of the top data is calculated by the multiply-add operation on the bottom data using the weight data having the same size as the kernel. For example, an element t11 of the top data is found by the following multiply-add operation.

$$t11 = b11 \times w11 + b12 \times w12 + b13 \times w13 + b21 \times w21 + \ldots + b33 \times w33$$

As illustrated in FIG. 10A to FIG. 10D, the elements of the top data are generated by the same operation, with the kernel used being shifted by one element on the bottom data each time. FIG. 10A to FIG. 10D illustrate an example where four elements, t11, t12, t13, t14, are calculated. The operations of the elements of the top data can be executed in parallel because of no data dependency among the elements, and these operations can be executed according to the SIMV instruction in this embodiment. For example, where the elements t11 to t44 of the top data are found by a processor including four processing units, the number of instructions is 3×3×4=36 if the SIMD instruction is used, but the use of the SIMV instruction makes it possible to complete the processing with one instruction.

As one of SIMV instructions, a conv16 instruction represented by "conv16% $f_{src1}$, % $f_{src2}$, % $f_{src3}$, % $f_{dst}$" is provided. This conv16 instruction is an instruction to calculate sixteen elements of the top data with one instruction. A mnemonic is "conv16", which takes three source operands and one destination operand. These operands are addresses in the register file.

It is assumed that at the time of the execution of the conv16 instruction, the bottom data and the weight data illustrated in FIG. 10A to FIG. 10D have been arranged at continuous addresses in the illustrated order on the register file 601. The first source operand 1 is given a head address of an area where the bottom data is arranged, and the source operand 2 is given a head address of an area where the weight data is arranged. The source operand 3 and the destination operand are given a head address of an area where to store the top data.

In the convolution operation, the shift of the addresses of the bottom data and the weight data is regular when one element of the top data is calculated. In the example illustrated in FIG. 10A to FIG. 10D, the three shifts along the continuous addresses and the shift to the next row are repeated three times at the time of the scanning in the kernel. This address pattern is determined by the kernel size and a shift amount to the next row. SIMV control information illustrated in FIG. 12 is set in the SIMV control information register 302. On this SIMV control information, the kernel size 1205 and the shift amounts (row steps) 1206 to 1208 to the next row are held. The SIMV address generating unit 301 calculates an address used to access the register file, with reference to the SIMV control information stored in the SIMV control information register 302.

In this embodiment, since the four processing units 306 are provided, four elements of the top data are first calculated as illustrated in FIG. 10A to FIG. 10D. Next, in order to hide the latency of the FMA operation, four elements on the next row of the top data are calculated. As illustrated in FIG. 11, four vectors are calculated in parallel with one instruction. When each of the vectors is calculated, positions of the used bottom data are different. Certain address displacements (constant) (vector steps) 1201 to 1204 each of which is a difference value from the head address of the area where the bottom data used for the calculation of each of the vectors is arranged are held as the SIMV control information. The SIMV control information is loaded from a memory in advance and is set in the SIMV control information register 302 before the software executes the conv16 instruction.

FIG. 13 illustrates an example of an address generation pseudo-code for the generation of addresses involved in the convolution operation in the SIMV address generating unit 301. In the code illustrated in FIG. 13, v is a loop of a vector, and f is a loop of the FMA operation. Presumably, by calculating the lines of src[123]_reg of this code, it is possible to calculate the addresses of the operands in the register file. Since the address pattern to be set in the vector instruction queues has been decided when the SIMV control information is set, it is possible to generate the addresses of the operands in the register file merely by adding only the operand values (underlined) given in the instruction.

The SIMV address generating unit 301 can generate the addresses also in the following manner. As illustrated in FIG. 14A, the address generating unit 301 is provided with a register 1401 storing a base address, an offset address table 1402, and an adder 1403 which adds their values. For example, in the convolution operation, the address pattern has been decided with respect to a given base point as previously described. This address pattern is held in the offset address table as illustrated in one example in FIG. 14B. When the conv16 instruction is executed, the operand address is set in the base address register 1401, the adder 1403 adds this address and the value taken out from the offset address table 1402, and the resultant value is queued in the vector instruction queue. The values of the offset address table can be set in advance using a software load instruction before the execution. This makes it possible to generate the addresses of the operands without the aforesaid address calculation.

The following describes an example where a max pooling operation in the deep learning is executed using the SIMV instruction in this embodiment. The max pooling operation is processing which, similarly to the convolution operation, selects an element having the largest value out of elements in a kernel having a certain size, and sets the selected element as an element of an image of the next layer. The max pooling operation involves a value comparison operation instead of the calculation. As one SIMV instruction, a maxpool16 instruction represented by "maxpool16% $f_{src1}$, % $f_{src2}$, % $f_{dst}$" is provided. In the processing of the maxpool16 instruction, as in the case of the aforesaid conv16 instruction, a base address is given as an operand, and addresses in a kernel are queued in vector instruction queues.

Figure 15:
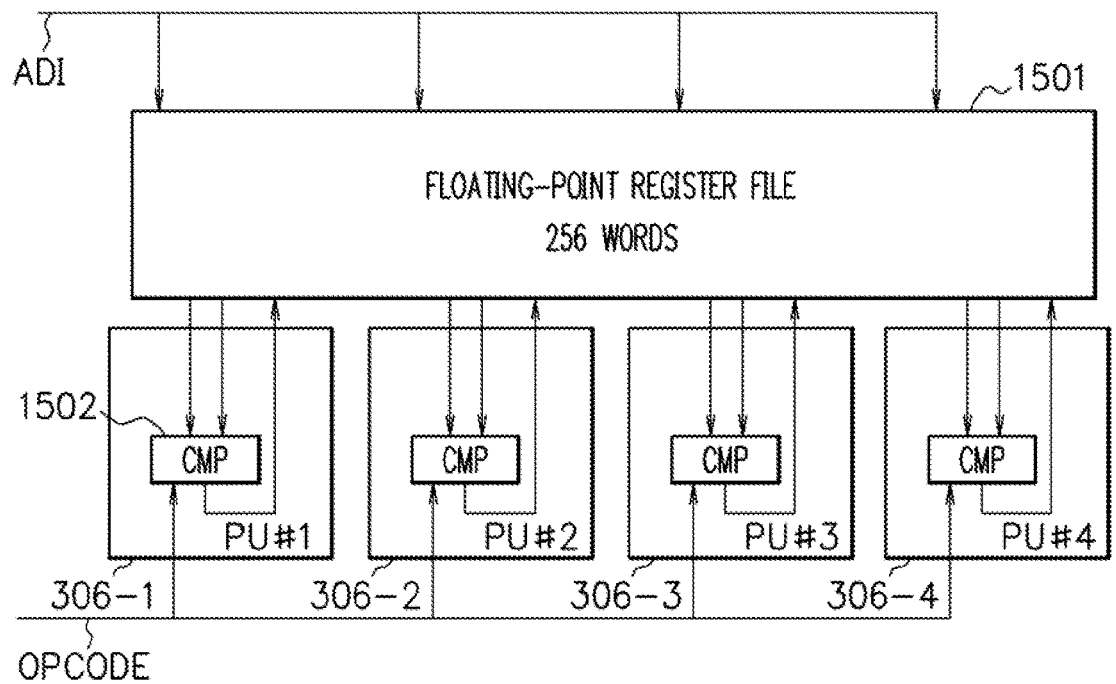
FIG. 15 is a diagram illustrating a configuration example of the processing unit in this embodiment.
Figure 16:
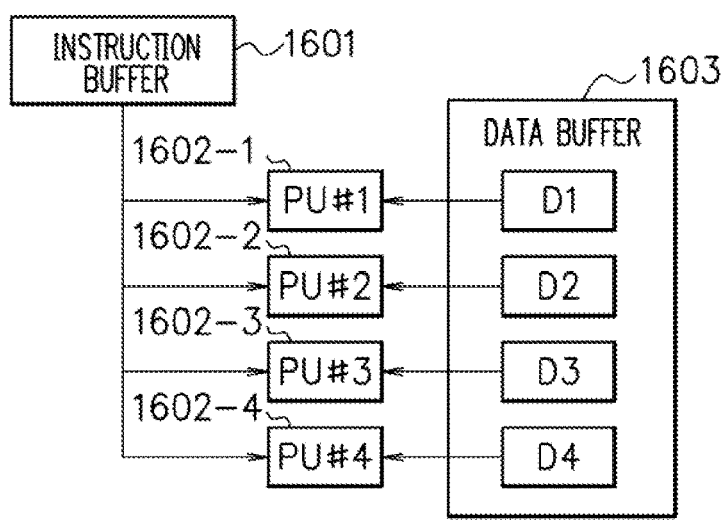
FIG. 16 is an explanatory diagram of a SIMD instruction.

FIG. 15 is a diagram illustrating a configuration example of a processing unit in this embodiment that performs the max pooling operation. The processor includes four processing units 306-1 to 306-4 each including a comparator (CMP) 1502, and is capable of executing four comparison operations concurrently. Two source operands are outputted to the comparators 1502 of the processing units 306-1 to 306-4 from a register file 1501 according to received address information ADI, and processing results in the comparators 1502 of the processing units 306-1 to 306-4 are written to the register file 1501. Further, an operation code OPCODE instructing the comparison operation is inputted to the processing units 306-1 to 306-4. The comparators 1502 each compare two source operands src1, src2, and when, for example, src1 is larger than src2, write src1 as the comparison result into the register file 1501, while, otherwise, writing src2 as the comparison result into the register file 1501.

As described above, according to this embodiment, the use of the SIMV instruction makes it possible to complete processing with one instruction in such a case where the same arithmetic processing is executed on a plurality of data in parallel a plurality of times as is done in the matrix calculation and the convolution operation in deep learning. This can greatly reduce the number of instructions to reduce hardware resources such as instruction caches used for the execution of instructions. Further, even if the operation latency changes, the operation latency can be hidden on an instruction level since the processing seen from the software remains the same. This eliminates a need for recompiling and the like even if the latency of the arithmetic processing changes, and thus facilitates ensuring compatibility of programs directly using an instruction, such as a library.

It should be noted that the above-described embodiments all illustrate only examples of embodiments in carrying out the present invention, and are not to be construed as limitations to the technical scope of the present invention. That is, the present invention can be embodied in a variety of forms without departing from its technical idea or its main features.

In one embodiment, it is possible to execute processing where the same arithmetic processing is executed on a plurality of data in parallel a plurality of times, with one instruction without any change of a sequence of instructions even if the operation latency changes.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A processor comprising:
    a decoding unit that decodes an instruction;
    an address generating unit that, when the instruction decoded by the decoding unit is an instruction to execute arithmetic processing on a plurality of operand sets each including a plurality of operands that are objects of the arithmetic processing, in parallel a plurality of times with a single instruction, generates an address set corresponding to each of the operand sets of the arithmetic processing for each time, based on a certain address displacement with respect to the plurality of operands included in each of the operand sets;
    a plurality of registers that hold the address sets corresponding to the respective operand sets, that are generated by the address generating unit, in correspondence to respective processing units; and
    a plurality of processing units that perform the arithmetic processing in parallel on the respective operand sets obtained based on the address sets outputted by the plurality of registers, wherein, out of the plurality of registers, a register that outputs the address sets to the plural processing units is selected by round-robin.

2. The processor according to claim 1, wherein, when first arithmetic processing corresponding to a first address set held in a first register, out of the plurality of registers, and second arithmetic processing corresponding to a second address set held in a second register have no operand dependency, the first address set from the first register and the second address set from the second register are alternately outputted cycle by cycle to the plural processing units.

3. The processor according to claim 1, wherein the arithmetic processing is a multiply-add operation.

4. The processor according to claim 1, wherein the arithmetic processing is a comparison operation to compare values of the operands.

5. The processor according to claim 1, wherein a number of the plurality of registers is a number according a number of cycles of an operation latency in the processing unit.

6. The processor according to claim 5, wherein the number of the plurality of registers is same number as the number of cycles of the operation latency in the processing unit.

7. The processor according to claim 1, wherein
the plurality of registers hold the address sets that are generated by the address generating unit with an operation code instructing a type of the arithmetic processing in correspondence to the respective processing units, and
the plurality of processing units perform the arithmetic processing instructed by the operation code in parallel on the respective operand sets obtained based on the address sets.

8. A control method of a processor, the control method comprising:
decoding an instruction by a decoding unit of the processor;
when the instruction decoded by the decoding unit is an instruction to execute arithmetic processing on a plurality of operand sets each including a plurality of operands that are objects of the arithmetic processing, in parallel a plurality of times with a single instruction, generating, by an address generating unit of the processor, an address set corresponding to each of the operand sets of the arithmetic processing for each time, based on a certain address displacement with respect to the plurality of operands included in each of the operand sets;
holding, by a plurality of registers of the processor, the address sets corresponding to the respective operand sets, that are generated by the address generating unit, in correspondence to respective processing units; and
performing, by a plurality of processing units of the processor, the arithmetic processing in parallel on the respective operand sets obtained based on the address sets outputted by the plurality of registers,
wherein, out of the plurality of registers, a register that outputs the address sets to the plural processing units is selected by round-robin.

* * * * *